3,149,425
SELF-ERASING DEVICE
Benjamin J. Barish, P.O. Box 1169, Tel Aviv, Israel
Filed May 21, 1962, Ser. No. 196,196
14 Claims. (Cl. 35—61)

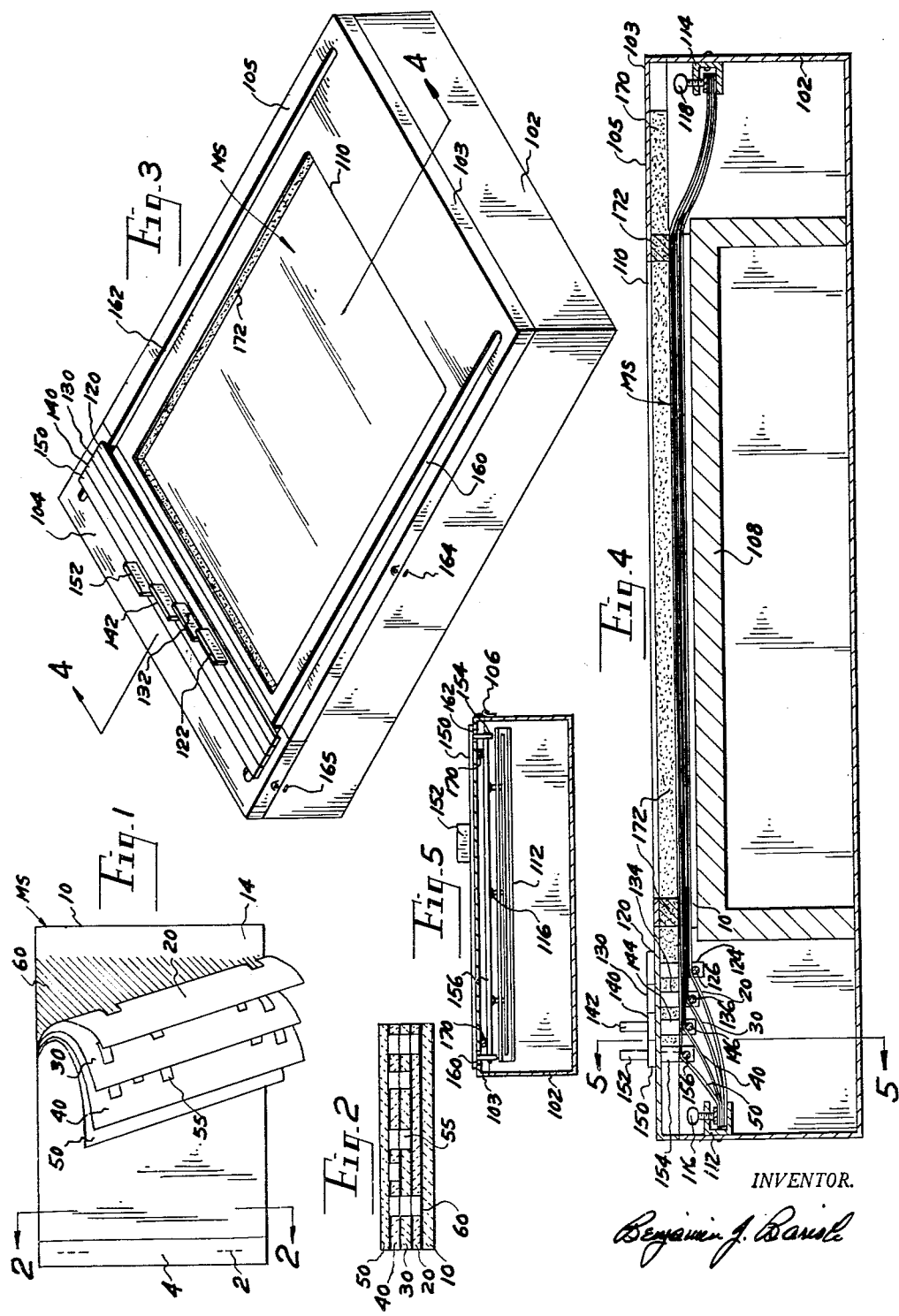

My invention relates to self-erasing devices, or what is commonly referred to as self-erasing slates. It is herein described as embodied in a device particularly useful as an aid in learning or memorizing information in accordance with the so-called "vanishing technique."

This application is related to my earlier application Serial No. 192,554, filed May 4, 1962.

The vanishing technique of memorizing is illustrated in my application Serial No. 192,554. Briefly, it can be demonstrated by the following: Write the text to be memorized on a blackboard. Have the subject read it aloud without making any effort to memorize it. Erase a few letters on each line. Have the subject read it again. Repeat the process, each time erasing more letters and complete words until the text has completely vanished. At each reading the subject makes no effort to memorize, though he may have to make some effort to recall. For a dozen lines of average difficulty, it has been found that four or five readings are ordinarily sufficient to eliminate the text altogether.

This technique can be advantageously used not only for memorizing text, but also for learning such things as geography, foreign languages, etc. Various types of teaching machines and systems have been devised based on this technique, but they generally involve relatively complicated and costly mechanical, optical and/or electronic arrangements to display the information to be learned or memorized in successive stages of vanishment.

By my invention, however, I provide a relatively simple and inexpensive device which permits successive partial erasures of the information until the information is completely erased. My device operates on the self-erasing slate effect.

The magic slate effect is described in my application Serial No. 192,554, which also illustrates a number of structures for producing this effect. Briefly, a self-erasing slate includes a colored backing sheet and an overlying impression sheet. The impression sheet is sufficiently opaque or translucent so that it normally hides the color of the backing sheet. However, when one writes on the impression sheet, as by a stylus, the two sheets are of such nature that the impression sheet adheres to the backing sheet along the pressure lines and becomes substantially transparent along the lines of adherence, allowing the color of the backing sheet to show through, thereby producing a write. All that is necessary to erase the write is to separate the impression sheet from the colored backing sheet.

A number of structures are described in my application Serial No. 192,554 for producing this self-erasing slate effect. For purpose of illustrating the present invention, I utilize the structure wherein the colored backing sheet is formed by applying a coating of wax and coloring matter, e.g. black pigment, to a sheet of paper or plastic. The wax provides a soft tacky layer for promoting the adhesion of the impression sheet along the writing lines, which transparentizes the impression sheet and renders the black color visible. Other devices may be used for producing this effect.

In my application Serial No. 192,554 I have disclosed a novel self-erasing slate which has at least two, but usually more, colored backing sheets one overlying the other, and an impression sheet overlying the topmost backing sheet. All the colored backing sheets, except the bottommost one, have openings therethrough which permit portions of underlying backing sheets to be engageable with the impression sheet. Information is applied to the impression sheet and is then partially erased as each backing sheet, starting from the bottom, is separated from the impression sheet. This effect will be described later in more detail.

An object of my present invention is to provide a device for more conveniently holding a self-erasing slate assembly such as described in my application Serial No. 192,554 while information is applied thereto and then sequentially separating the sheets to partially erase the information with each sheet separation.

A further object of my invention is to provide a novel device which can be used more effectively as an aid in memorizing or learning information in accordance with the vanishing technique.

A further object of my invention is to provide an improved self-erasing slate device highly useful for learning or memorizing, but which can also be used as a toy or game, or in other self-erasing slate applications.

For a better understanding of my invention, reference may be had to the drawings illustrating a preferred embodiment of the invention, in which:

FIGURE 1 illustrates a self-erasing slate assembly described in my application Serial No. 192,554;

FIGURE 2 is a sectional view along the lines 2—2 of FIGURE 1, the thicknesses of the sheets being somewhat exaggerated for purposes of clarity;

FIGURE 3 is a perspective view of a device embodying the present invention for particular use with the assembly of FIGURE 1;

FIGURE 4 is a sectional view of the device of FIGURE 3 along the lines 4—4; and

FIGURE 5 is a sectional view along lines 5—5 of FIGURE 4.

FIGURE 1 illustrates a novel self-erasing slate assembly described in my application Serial No. 192,554 for particular use as an aid for memorizing or learning in accordance with the vanishing technique. Briefly, the assembly, designated MS, includes four colored backing sheets 10, 20, 30 and 40 and an impression sheet 50 stacked one on top of another and bound along one margin by staples 2 and binding tape 4. Backing sheets 20, 30 and 40 are made of thin material such as plastic or paper, but backing sheet 10 is preferably made of thicker material such as cardboard or plastic. Impression sheet 50 is preferably made from thin plastic sheet material.

The upper surfaces of all the backing sheets 10, 20, 30 and 40, except for their margins (e.g. 14 with respect to sheet 10), are coated with a material which imparts a colored, tacky surface to each sheet. A suitable coating, generally designated as 60 on all the sheets, comprises a wax and a black pigment. Impression sheet 50, overlying the stack of backing sheets, is normally non-transparent so that it normally hides the color of the backing sheets. However, when it is pressed into contact with the tacky layer of the backing sheets, as by a pencil or stylus, it adheres to the surfaces of the backing sheets which it engages and becomes transparent along the lines of adherence, and thereby renders the color of the backing sheets visible.

The structure and arrangement of the colored backing sheets 10, 20, 30 and 40 are such that portions of the colored surfaces of each sheet are engageable with the impression sheet 50. For this purpose, bottommost sheet 10 is not formed with openings, but the next sheet 20 is formed with openings 55 (see FIGURE 2) according to a predetermined pattern. The next colored backing sheet 30 is formed with the identical form and arrangement of openings as sheet 20, but with further openings. Similarly, the next 40 is formed with the identical form and arrangement of openings as sheet 30, but with still further openings.

In use, the text to be learned is written on the impression sheet 50 which produces a write in accordance with the self-erasing slate effect described above. The subject reads it aloud, and then separates the bottommost colored sheet 10 from the others. This makes sheet 20 as the bottommost sheet. Those letters of the written text which originally registered with openings 55 of sheet 20 are thus erased. The subject again reads the remaining text aloud and then separates sheet 20 from the others. Sheet 30 thus becomes the bottommost sheet, and since it has additional openings 55 besides those corresponding to the openings in sheet 20, those letters which originally registered with the additional openings in sheet 30 are thus erased. The subject again reads the text aloud, and then separates sheet 30 from the others, which makes sheet 40 the bottommost colored sheet and erases that part of the original text registering with its additional openings. The process is repeated, but in the last step, separation of sheet 40 from impression sheet 50 effects a complete erasure of the original text.

Further details and variations are disclosed in my application Serial No. 192,554, and are not necessary for an understanding of my present invention which is directed to a holder or housing for a self-erasing slate sheet assembly such as described in my earlier application.

The novel device of the present invention, as illustrated in FIGURES 3, 4 and 5, comprises a holder or housing, generally designated 100, including a lower section 102 and an upper cover 103 made of two sections 104 and 105 both hinged at 106 to normally overlie the lower section 102, but each moveable to an open position to provide access into the lower section 102. A table 108 providing a rigid writing surface is supported internally of the lower section 102. Upper section 105 is formed with an opening or window 110 in alignment with table 108.

Table 108 is adapted to support the self-erasing slate assembly MS for writing thereon through opening or window 110 of the upper section 105. As shown particularly in FIGURE 4, the mid-portion of all the sheets of the assembly MS are supported on table 108. One end of all the sheets, except the bottommost colored backing sheet 10, is secured by a clamp 112 carried by one wall of section 102, and the other end of the sheets is secured by a clamp 114 carried by the opposite wall. This arrangement permits the assembly to be conveniently changed to provide a different program of sequential partial erasures, it being appreciated that the program is determined by the number and character of the openings 55 in the colored sheets. However, since the bottommost colored sheet 10 does not contain any openings, and cannot therefore affect the program of partial erasures, this sheet may be fixedly secured to table 108, as illustrated in FIGURE 4, and not be included in the replaceable part of the assembly MS.

To replace an assembly MS with another, all that is necessary is to open section 105; turn manually thumb screws 116 and 118 (there being about three for each clamp) which releases the ends of the assembly from clamps 112 and 114, respectively; insert the new assembly MS and tighten screws 116 and 118, and then reclose section 105.

Means are provided for individually separating the colored backing sheets in sequence from the impression sheet 50, starting with the bottommost sheet 10 and continuing through the topmost backing sheet 40. This means includes a slide for each of the backing sheets, the slides being generally designated 120, 130, 140 and 150, respectively. All the slides are carried on the upper section 104 of housing 102 and ride across a pair of slots 160 and 162 formed on opposite sides of the opening 110 in the upper section.

All the slides are of similar structure. Referring to slide 120, for example, it is seen that it is elongated to extend between slots 160 and 162. It includes a finger piece or manipulatable member 122, a pair of arms 124 extending through slots 160 and 162, and an elongated element 126 carried between arms 124 in lower section 102 of the housing. Slide 130 has corresponding elements labeled 132, 134 and 136; slide 140 has corresponding elements labeled 142, 144 and 146; and slide 150 has corresponding elements labeled 152, 154 and 156.

The elongated elements 126, 136, 146 and 156 engage the several sheets in the self-erasing slate assembly and effect the individual separation of the sheets. Thus, assembly MS is inserted so that element 126 passes between sheets 10 and 20; element 136 passes between sheets 20 and 30; and element 156 passes between sheet 40 and impression sheet 50. These elements are preferably of small diameter rods journalled between their respective supporting arms and disposed in a line just slightly above the table 108.

In operation, the material to be learned or memorized is written on the self-erasing slate assembly MS through opening 110. It is then caused to be partially erased in steps by first moving slide 120 along slots 160 and 162, which separates colored backing sheet 10; then moving slide 130 which separates sheet 20; then moving slide 140 which separates sheet 30; and finally moving slide 150 which separates sheet 40 from impression sheet 50, thereby effecting a complete erasure of the material.

A different assembly MS can be conveniently inserted by opening the upper section 105 along its hinges and inserting the new assembly in the manner described above. A latch 164 retains the upper section in a closed position until it is desired to be opened. A similar latch 165 normally retains section 104 closed.

A strip of cushioning material 170, such as felt or sponge rubber, may be applied to the underside of the upper section 104 coextensive with slots 160 and 162, and bordering the adjacent sides of the opening 110. Further strips 172 of the same cushion material may also be applied to border the remaining sides of opening 110. Strips 170 and 172 tend to seal opening 110, to press down the self-erasing slate assembly MS against table 108, and to provide a light load against movement of slides 120, 130, 140 and 150.

The described device is well adapted for use in a number of ways. For example, it can be used for memorizing a text, as by placing a sheet of writing paper over the self-erasing slate MS, closing both upper sections 104 and 105 thereover to retain it in place, writing the text in pencil or pen, removing the sheet of writing paper, and then effecting a partial erasure, between each reading, by sequentially moving slides 120, 130, 140 and 150, as described above. Also, separate self-erasing slate assemblies or transparent overlying sheets can be prepared and kept on file for specific things to be learned, such as the countries of certain continents, foreign languages, etc. In this application, the outline of the countries would be printed on the impression sheet, or the overlying transparent sheet. The subject would be required to insert the names of the countries, as from prepared material, which names would be selectively erased by moving the slides 120–150 while the countries are memorized. The ease and convenience involved in inserting new self-erasing slate assemblies or overlying sheets enable the device to be used in a large number of applications.

In addition, the device can also be used as a conventional self-erasing slate, as a toy or game, where the written information is completely removed in one operation. This can be done by moving slides 120, 130 and 140 to the right side before the information is written. This leaves only slide 150 to be manipulated, which effects the complete erasure when it is moved from the left side to the right side.

A number of other applications, as well as many variations and modifications, of the disclosed device will be readily apparent to those skilled in the art coming within the spirit and scope of my invention as defined in the following claims.

I claim:
1. A self-erasing device comprising: a housing including a lower section and a cover; said cover being divided into a first upper section and a second upper section the latter being hinged to said lower section for movement from a closed to an open position; a table disposed in said lower section for supporting a self-erasing sheet assembly including at least an impression sheet and an underlying colored backing sheet; means within said lower section for securing the ends of at least the impression sheet of said sheet assembly with the main portion thereof supported on said table; said second upper section being formed with a window in alignment with said table; both of said upper sections being formed with an elongated slot on each side of said window; manipulatable means normally carried by said first upper section, said manipulatable means projecting through said elongated slots into said lower section and movable past said window; and an elongated element carried by said manipulatable member and disposed in said lower section, said elongated element being adapted to pass between the sheets of the self-erasing assembly for separating them when said manipulatable member is moved along the elongated slots.

2. A self-erasing slate device comprising: a housing including a lower section and a cover; said cover being divided into a first upper section and a second upper section each independently hinged to said lower section for independent movement from a closed to an open position; a table disposed in said lower section for supporting a self-erasing slate sheet assembly including at least an impression sheet and an underlying colored backing sheet; means within said lower section for securing the ends of at least the impression sheet of said self-erasing slate sheet assembly with the main portion thereof supported on said table; one of said upper sections being formed with a window in alignment with said table; both of said upper sections being formed with an elongated slot on each side of said window; a manipulatable member normally carried by the other of said upper sections, said manipulatable member projecting through said elongated slots into said lower section and movable past said window; and an elongated element carried by said manipulatable member and disposed in said lower section, said elongated element being adapted to pass between the sheets of the self-erasing slate assembly for separating them when said manipulatable member is moved along the elongated slots.

3. A self-erasing device comprising: a housing including a lower section and an upper section; a table disposed in said lower section for supporting a self-erasing sheet assembly including an impression sheet and a plurality of underlying colored backing sheets; said upper section being formed with a window in alignment with said table; and a plurality of movable means projecting through said upper section, each of said movable means being adapted to separate one of said colored backing sheets from the sheet overlying same when moved.

4. A self-erasing device comprising: a housing including a cover closing the top thereof; a table disposed in said housing for supporting a self-erasing sheet assembly including an impression sheet and a plurality of underlaying colored backing sheets; said cover being formed with a window in alignment with said table; and a plurality of manipulatable members projecting through said cover into said housing, each of said manipulatable members carrying means adapted to separate one of said colored backing sheets from an overlying sheet when the manipulatable member is moved.

5. A self-erasing device comprising: a housing including a lower section and an upper section; a table disposed in said lower section for supporting a self-erasing sheet assembly including an impression sheet and a plurality of underlying colored backing sheets; means within said lower section for securing the ends of at least certain sheets of said self-erasing sheet assembly with the main portion of the assembly supported on said table; said upper section being formed with a window in alignment with said table; and a plurality of manipulatable means projecting through said upper section, each of said manipulatable means being adapted to pass between a colored backing sheet and the sheet overlying same and being independently movable across said window so as to independently separate its respective colored backing sheet from its overlying sheet.

6. A self-erasing device comprising: a housing including a cover closing the top thereof; a table disposed in said housing for supporting a self-erasing sheet assembly including an impression sheet and a plurality of underlying colored backing sheets; said cover being formed with a window in alignment with said table and an elongated slot on each side of said window; a plurality of manipulatable members projecting through said elongated slots into said housing and independently movable along said elongated slots past said window; and an elongated element carried by each of said manipulatable members; each of said elongated elements being adapted to pass between a colored backing sheet and an overlying sheet for separating same when its manipulatable member is moved.

7. A device as defined in claim 6 wherein said cover is divided into two sections, one of said sections being formed with said window and the other of said sections carrying said manipulatable members in the positions they normally assume before they are moved past said window.

8. A device as defined in claim 7 wherein each of said two sections is independently hinged to said housing so that each can be independently opened and closed; and latch means for latching each of said sections in its closed position.

9. A self-erasing device comprising: a housing including a lower section and an upper section; a table disposed in said lower section for supporting a self-erasing sheet assembly including an impression sheet and a plurality of underlying colored backing sheets; said upper section being formed with a window in alignment with said table and being further formed with an elongated slot on each side of said window; a plurality of manipulatable members each having a pair of arms extending through said slots into said lower section and being movable along said slots past said window; and an elongated element carried between each pair of arms; each of said elongated elements being adapted to pass between a colored backing sheet and an overlying sheet for separating same when its respective manipulatable member is moved past said window.

10. A self-erasing device as defined in claim 9 wherein said upper section includes at least one part hinged to the lower section so as to be openable to provide access into said lower section.

11. A device as defined in claim 9 wherein said upper section is divded into two parts, one of said parts being formed with said window and the other of said parts carrying said manipulatable members; said part formed with said window being hingedly mounted to said lower section so as to be openable to provide access into said lower section.

12. A device as defined in claim 9 wherein said lower section includes releasable clamping means engageable with opposite ends of said self-erasing sheet assembly.

13. A device as defined in claim 9 wherein said upper section is provided with a strip of cushioning material between each of said slots and the adjacent edge of said window.

14. A self-erasing device comprising: a housing including a lower section and an openable upper section; a table disposed in said lower section for supporting a self-erasing slate assembly including at least an impression sheet and an underlying colored tacky coating; said upper section being formed with a window in alignment with said table and being further formed with an elongated slot on each side of said window; manipulatable means projecting through said elongated slots into said lower section and movable past said window; an elongated element carried by said manipulatable means and disposed in said lower section, said elongated element being adapted to pass between the self-erasing slate assembly for separating the impression sheet from said colored tacky coating when said manipulatable means is moved along the elongated slots; and strips of cushioning material between the two sections and co-extensive with said slots; said elongated elements engaging said cushioning material during its movement, the cushioning material being thereby effective to provide a light load against the movement of said manipulatable means.

References Cited in the file of this patent

FOREIGN PATENTS

| | | |
|---|---|---|
| 567,844 | France | Dec. 13, 1923 |
| 1,178,213 | France | Dec. 8, 1958 |